UNITED STATES PATENT OFFICE.

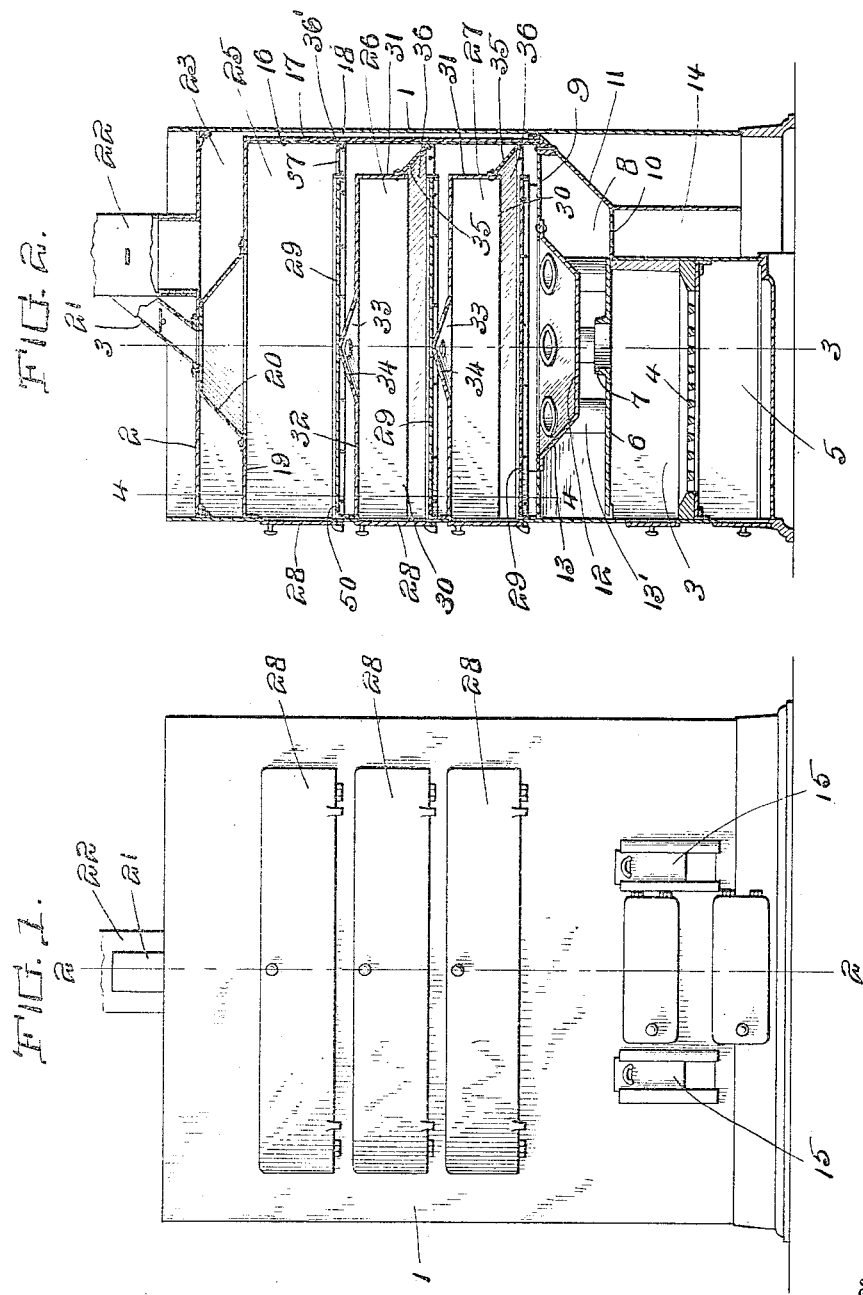

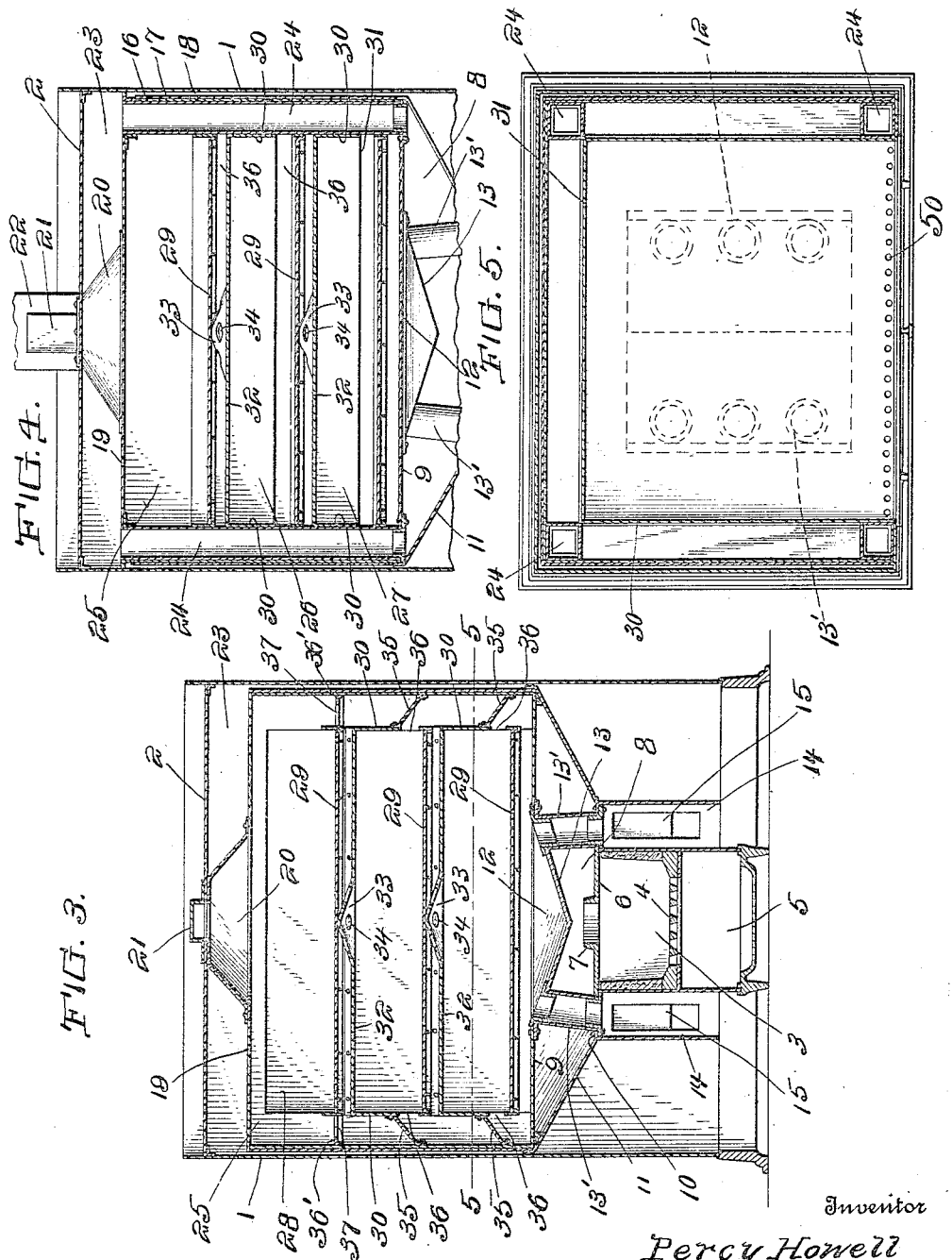

PERCY HOWELL, OF PORTLAND, OREGON.

PORTABLE BAKING-OVEN.

1,243,605.	Specification of Letters Patent.	Patented Oct. 16, 1917.

Application filed December 29, 1916. Serial No. 139,638.

*To all whom it may concern:*

Be it known that I, PERCY HOWELL, a citizen of the United States, residing at Portland, in the county of Northampton and State of Oregon, have invented new and useful Improvements in Portable Baking-Ovens, of which the following is a specification.

This invention relates to improvements in the construction of baking ovens, and the primary object of the invention is to produce an oven which is preferably of a portable nature, and wherein the construction and arrangement of parts is such that the heat from the fire-box will be equally and uniformly distributed through all parts of the baking chambers of the oven.

In carrying out my invention it is my purpose to provide a baker's oven with a centrally arranged fire-box wholly or partially surrounded by an air chamber, to arrange above the fire-box a radiating chamber for the heat units, the said radiating chamber having its upper wall centrally provided with a deflector which is adapted to direct the products of combustion through smoke columns arranged at the corners of the device and over the top of the oven proper which is secured to but spaced from the outer casing of the device and which is provided with one or a plurality of baking chambers each comprising an independent member including bottom, sides and a top, the bottom being spaced from the sides or the said sides being provided with openings and the top being formed with an apertured dome whereby the heat units will circulate through all parts of the baking chambers and find an exit through the apertured dome.

It is also my purpose to construct a portable oven including an outer casing surrounding the oven casing, the said oven casing having arranged therein but spaced therefrom a plurality of baking chambers, the said oven casing and baking chambers being disposed above the fire-box and the oven chambers being of such a construction that the heat units will be permitted to circulate around every portion thereof to find an exit through the top of said chambers, being provided for regulating the amount of heat permitted to enter the said chambers.

It is a still further object of the invention to produce a portable oven which shall embody the desirable features of simplicity in construction, cheapness to manufacture and thorough efficiency in operation.

With the above and other objects in view the improvement resides in the construction, combination and arrangement of parts set forth in the following specification and falling within the scope of the appended claims.

In the drawings:

Figure 1 is a front elevation of a portable oven constructed in accordance with the present invention, Fig. 2 is a sectional view approximately on the line 2—2 of Fig. 1.

Fig. 3 is a sectional view approximately on the line 3—3 of Fig. 2,

Fig. 4 is a sectional view approximately on the line 4—4 of Fig. 2,

Fig. 5 is a horizontal sectional view approximately on the line 5—5 of Fig. 3.

The outer shell or casing of the improvement is indicated by the numeral 1. In the construction illustrated by the drawings the said casing 1 is of a substantially rectangular formation in plan, but it is to be stated that I am not to be restricted to any particular size or shape nor to any particular material from which the various parts of my improvement are constructed. However, as the improvement is preferably of a portable nature the casing 1 may, if desired, be constructed from sheet or similar iron. The shell is provided with a closed top 2 but its bottom is open, and arranged centrally within the said shell is the combustion chamber 3. The chamber 3 communicates with the front or shell 1, but is spaced from the sides and rear thereof, so that a space, which I will term an air chamber, is arranged between three of the sides of the combustion chamber 3 and the shell 1. The combustion chamber includes the usual fire-box which is separated by the grate 4 from the ash pit 5, and as disclosed in Fig. 1 of the drawings, suitable doors are provided whereby access may be had to the fire-box and to the ash pit. The fire-box has arranged upon its top a plate 6 having a central opening which is preferably surrounded by outwardly extending flanges 7, the said opening providing the outlet for the products of combustion to direct the same to within the radiating chamber 8. The radiating chamber includes a hollow member comprising an upper wall 9, a parallel lower wall 10 and beveled walls 11 connecting the top and bottom walls. The top wall 9 is centrally provided with a substantially V-shaped depressed portion 12, the apex of the same being disposed directly centrally of the opening in the top plate 6 of the fire-box, and by this arrangement it will be noted that the oppositely disposed angular walls 13 provided by the said depressed portion 12 will serve to guide the heat units and products of combustion to the opposite sides of the chamber 8, and consequently against the side or beveled walls 11 of the said chamber.

The numerals 13' designate a plurality of angularly arranged pipe members communicating between the walls 13 of the deflector 12 and the lower wall 10 of the radiating chamber. These pipe members provide air ducts between the air chamber, indicated for distinction by the numeral 14, and the oven proper, as will readily be apparent, and if desired the shell 1 may be provided adjacent the bottom thereof with suitable openings closed by suitable dampers, while the front wall of the said casing between the shell and the combustion chamber 3 is provided with vertically disposed openings arranged in a line with the air ducts 13, the side and lower wall provided by the said openings being flanged or otherwise formed with guide members to receive flat valves 15. By this arrangement it will be noted that air from the exterior of the oven may be directed to within the air chamber and from thence through the ducts 13' to the oven proper.

The oven casing is indicated by the numeral 16 and comprises a substantially rectangular hollow member, the outer walls of which having a facing of asbestos or other non-heat conducting material, as indicated by the numeral 17, and the oven casing is spaced from the shell 1 providing an air space 18 therebetween. The top of the oven, indicated for distinction by the numeral 19, is disposed a suitable distance below the top 2 of the shell 1, and the said top 19 is centrally provided with an upwardly flared portion or dome 20 that communicates centrally with the top 2, the said dome having its upper wall secured to the heat outlet pipe 21, and this pipe at a suitable distance above the top of the construction communicates with the smoke outlet pipe 22, the said smoke outlet pipe being secured to the top 2 and surrounding an opening in the said top so as to communicate with the smoke chamber 23 provided between the top 2 of the shell 1 and the top 19 of the oven casing.

Communicating between the smoke chamber 23 and the radiating chamber 8, and secured at the corners of the shell 1 and also supporting the oven chamber 16 at the corners thereof are smoke columns 24, the same being preferably, but not necessarily, rectangular or square in cross section, and by such a construction and arrangement of parts it will be noted that the products of combustion from the fire-box after passing through the radiating chamber 8 will be directed upwardly of the device at the corners thereof so that a proper heating of the construction at the said corners will be thus provided for. It is, of course, to be understood that the smoke outlet pipe 22 is provided with a suitable damper, as is also the heat outlet pipe 21.

Within the casing 16 is disposed the baking chambers, three of the same being illustrated by the drawings and are indicated for distinction by the numerals 25, 26 and 27. The top wall 19 of the oven casing 16 provides the upper wall for the upper chamber 25. As disclosed in Fig. 1 of the drawings, a separate door 28 is provided for each of the baking chambers, the said doors being hinged at their lower edges and provided with lugs adapted to contact with the outer face of the shell, whereby when the same are swung to their open position they will be sustained horizontally and thus provide shelves. Each of the baking chambers except the top chamber, includes a lower wall 29, side and end walls 30 and 31 respectively and a top 32 which communicates with the sides and ends. The sides and top are connected to the front wall of the shell 1, and the top walls 32 of each of said chambers is centrally provided with an outwardly extended substantially conical portion providing a dome 33, the element 20, comprising the dome for the upper chamber 1. Each of the domes 33 is formed with a series of openings 34, and the domes of the chambers 26 and 27 contact centrally with and may be secured to the bottom walls of the chambers 25 and 26 respectively, the contacting relation between the domes and the said bottom walls serving also to assist in maintaining the top and bottom walls of the respective chambers in proper spaced relation. The side and end walls of each of the chambers may be spaced from the bottom walls thereof, or the said side and end walls may be provided with a plurality of openings communicating with the said chambers at the bottom thereof. The respective chambers are spaced from the oven casing 16, plates 35—35 being disposed between the said chambers and the said casing, and the said plates entirely surround the baking chambers. The plates 35 cover the openings or spaces 36 between the bottom, side and end walls of the chambers, and preferably the said plates are arranged at an inclination as shown in the drawings so as to serve as directing elements whereby the heat units passing through the flues 13 will be directed by the lower plates 35 through the openings 36 in the bottom of the chamber 27 and from thence through the openings 34 in the dome 33 of the said chamber over the top of the chamber and against the next plate 35 through the spaces adjacent to the bottom of the chamber 26, through the openings in the dome of the said chamber, while the spacing or directing plate 36 for the upper chamber 25 is provided with spaced openings 37 so that the heat units can find a passage therethrough and be directed to the uppermost baking chamber 25, the said heat units finding an outlet through the dome 20 and through the pipe 21.

The bottom walls of all of the baking chambers adjacent to the front thereof are each provided with a series of apertures 50 to further insure the circulation of the heat units through the chambers.

Having thus described the invention, what I claim is:

1. In a baking oven, a shell, a fire-box in the shell, a radiating chamber over the fire-box, an oven casing connected with the radiating chamber, baking chambers in the oven casing, deflector plates spacing said chambers from said casing, and said chambers having air inlet openings at the bottom thereof and air outlet openings at the top thereof.

2. In a baking oven, a shell having an outlet pipe, a fire-box in the shell and spaced therefrom, a heat radiating chamber over the fire-box and communicating with the said fire-box, smoke columns between the radiating chamber and the top of the shell, an oven casing connected with the radiating chamber, baking chambers in the oven casing, deflector plates spacing said chambers from the casing, and said chambers having air inlet openings at the bottom thereof and air outlet openings at the top thereof.

3. In a baking oven, a shell having an outlet pipe, a fire-box in the shell and spaced therefrom to provide an air chamber between the fire-box and the shell, a radiating chamber over the air chamber and fire-box and communicating with the said fire-box, smoke columns between the radiating chamber and the top of the shell, an oven casing in the shell and spaced therefrom, a facing of non-heat conducting material between the casing and shell, baking chambers in the oven casing, deflector plates spacing said chambers from the casing and the baking chambers from one another, and said baking chambers having air inlet openings at the bottom thereof and air outlet openings in the top thereof.

4. In a baking oven, a shell having an outlet pipe at the top thereof, a fire-box in the shell and spaced therefrom to provide an air chamber between the shell and fire-box, a radiating chamber disposed over the air chamber and fire-box and having an opening communicating with the fire-box, smoke columns between the radiating chamber and the top of the shell, an oven casing disposed over the radiating chamber and secured thereto and spaced from the shell, baking chambers in the oven casing, deflector plates between the baking chamber and the oven casing closing the spaces between the baking chambers and the oven casing and separating the baking chambers, said baking chambers having inlet openings at the bottom thereof and outlet openings at the top thereof, and air ducts passing through the radiating chamber between the air chamber and the oven casing.

5. In a baking oven, a shell having an outlet pipe at the top thereof, a fire-box in the shell and spaced therefrom to provide an air chamber between the shell and fire-box, a radiating chamber disposed over the air chamber and fire-box and having an opening communicating with the fire-box, smoke columns between the radiating chamber and the top of the shell, an oven casing disposed over the radiating chamber and secured thereto and spaced from the shell, baking chambers in the oven casing, deflector plates between the baking chambers and the oven casing closing the spaces between the baking chambers and the oven casing and separating the baking chambers, said baking chambers having inlet openings at the bottom thereof and outlet openings at the top thereof, air ducts passing through the radiating chamber between the air chamber and the oven casing, and valves for the air chamber.

6. In a baking oven, a shell having a closed top and a valved outlet pipe communicating with the top, a fire-box in the shell and spaced therefrom to provide an air chamber between the said shell and the said fire-box, a radiating chamber disposed over the air chamber and over the fire-box and having a flanged opening communicating with the fire-box, a deflector member within the radiating chamber, pipe members comprising ducts between the air chamber and the outer wall of the deflector, valves for the air chamber, smoke columns between the radiating chamber and the top of the shell, an oven casing connected with the radiator chamber and spaced from the shell, the top of the oven casing being centrally dome-shaped and having a valved outlet pipe communicating with the outlet pipe of the shell, baking chambers in the oven chambers, deflector plates spacing said chambers from the casing to provide partitions between the superimposed baking chambers, the uppermost plate being apertured, and said baking chambers at the bottoms thereof being provided with air inlet openings and having air outlet openings at the top thereof.

7. In a baking oven, a shell having a closed top and an outlet pipe connected with the top, a fire-box centrally arranged in the shell at the bottom thereof and providing an air chamber between the said shell and the said fire-box, a radiating chamber disposed over the air chamber and fire-box and communicating with the said fire-box, a deflecting member within the chamber, smoke columns between the chamber and the top of the shell, an oven casing arranged over the radiating chamber and spaced from the shell, the top of said oven chamber being centrally dome-shaped and having an outlet pipe connected thereto, baking chambers within the oven chamber, plates connecting the baking chambers with the oven casing and providing deflecting members between the said casing and said chambers, said chambers being also spaced away from each other and having their top provided with openings and being further provided with openings adjacent the bottom thereof and the spacing plate for the upper baking chamber being apertured, as and for the purpose set forth.

In testimony whereof I affix my signature.

PERCY HOWELL.

Copies of this patent may be obtained for five cents each, by addressing the "Commissioner of Patents, Washington, D. C."